(12) United States Patent
Stadler et al.

(10) Patent No.: US 8,534,446 B2
(45) Date of Patent: Sep. 17, 2013

(54) CONVEYING DEVICE FOR AUTOMATION PRODUCTION LINES

(71) Applicant: EBZ Systec GmbH, Ravensburg (DE)

(72) Inventors: Rainer Stadler, Rast (DE); Alexander Schmeh, Ravensburg (DE)

(73) Assignee: EBZ Systec GmbH, Ravensburg (DE)

( * ) Notice: Subject to any disclaimer, the term of this patent is extended or adjusted under 35 U.S.C. 154(b) by 0 days.

(21) Appl. No.: 13/647,571

(22) Filed: Oct. 9, 2012

(65) Prior Publication Data
US 2013/0062158 A1    Mar. 14, 2013

Related U.S. Application Data

(63) Continuation of application No. PCT/EP2011/001974, filed on Apr. 19, 2011.

(30) Foreign Application Priority Data

Apr. 19, 2010   (DE) .................... 10 2010 015 618

(51) Int. Cl.
  *B65G 15/64* (2006.01)
(52) U.S. Cl.
  USPC .................................... 198/345.1; 198/346.3
(58) Field of Classification Search
  USPC .......... 198/345.1, 345.2, 345.3, 346.1, 346.3, 198/465.1
  See application file for complete search history.

(56) References Cited

U.S. PATENT DOCUMENTS

| | | | |
|---|---|---|---|
| 4,898,268 A * | 2/1990 | Kamioka et al. | 198/345.1 |
| 5,191,958 A * | 3/1993 | Tolocko | 198/346.2 |
| 5,282,324 A * | 2/1994 | Cheng | 36/3 B |
| 5,438,740 A * | 8/1995 | Carr et al. | 198/345.3 |
| 6,190,997 B1 * | 2/2001 | Becker et al. | 438/401 |
| 6,758,320 B1 * | 7/2004 | Tegel | 198/345.1 |
| 2003/0070902 A1 | 4/2003 | Weinand et al. | |

FOREIGN PATENT DOCUMENTS

DE   20 2007 005 034 U1   8/2008

OTHER PUBLICATIONS

International Search Report and Written Opinion dated Jul. 22, 2011.

* cited by examiner

*Primary Examiner* — James R Bidwell
(74) *Attorney, Agent, or Firm* — Burr & Brown

(57) ABSTRACT

The invention relates to a conveying device for the transport of components or component groups from and to one or more workstations, the conveying device comprising a conveying track and a component carrier truck moved on the conveying track, and there being provided in the region of the workstations, on the conveying track, positioning devices which cooperate with positioning devices on the component carrier truck in such a way that a desired position of the component carrier truck in the workstation is assumed in all three space directions (X, Y, Z) directly as a result of the travel-in movement of the component carrier truck into the workstation, characterized in that, during the entire travel-in movement of the component carrier truck into the workstation, each positioning device on the component carrier truck comes into contact with only its positioning device, determining the desired position, on the conveying track.

19 Claims, 11 Drawing Sheets

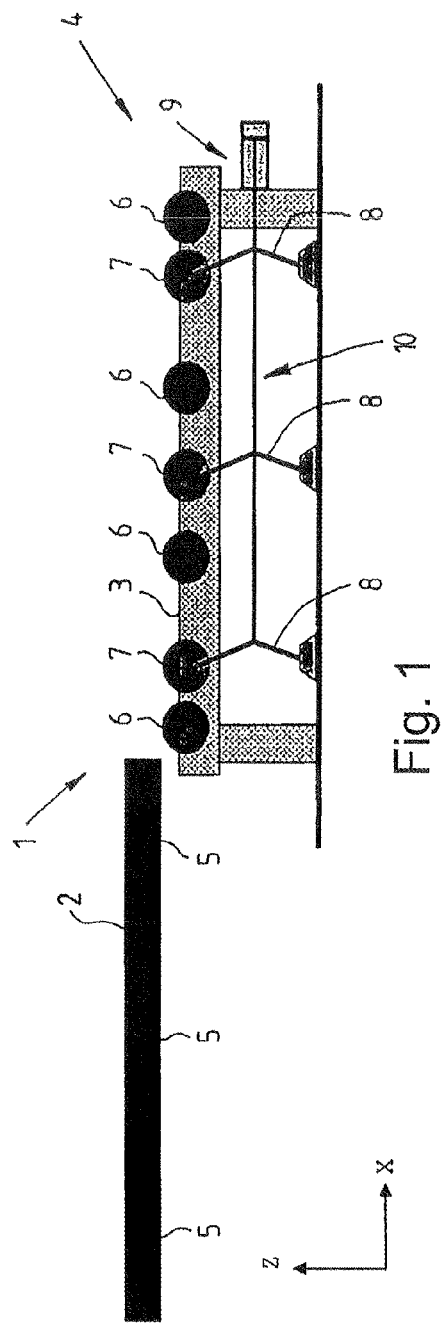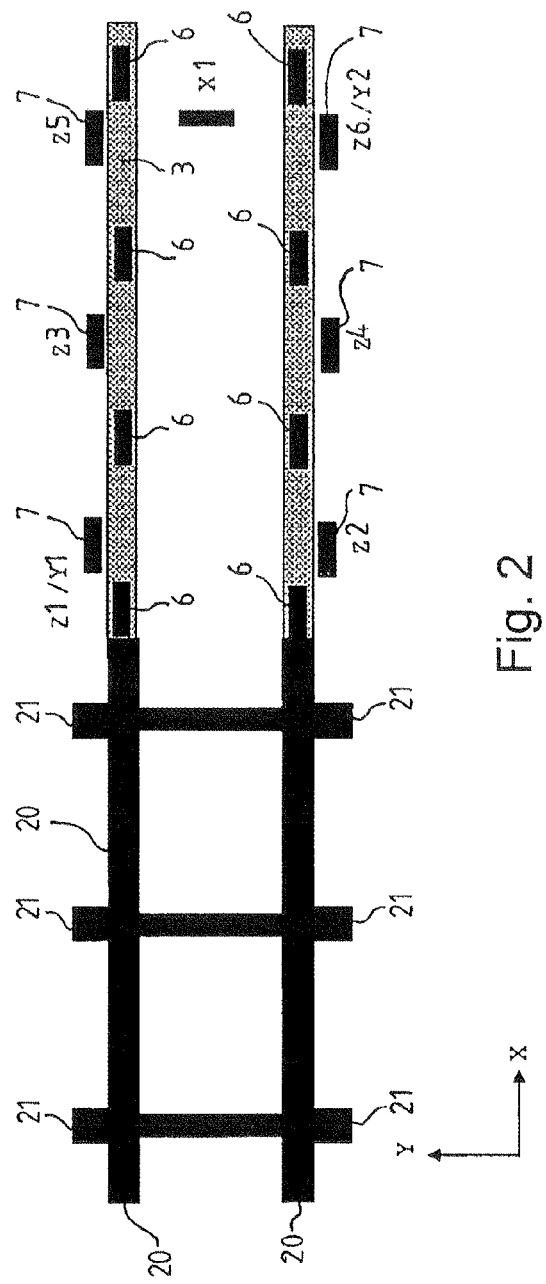

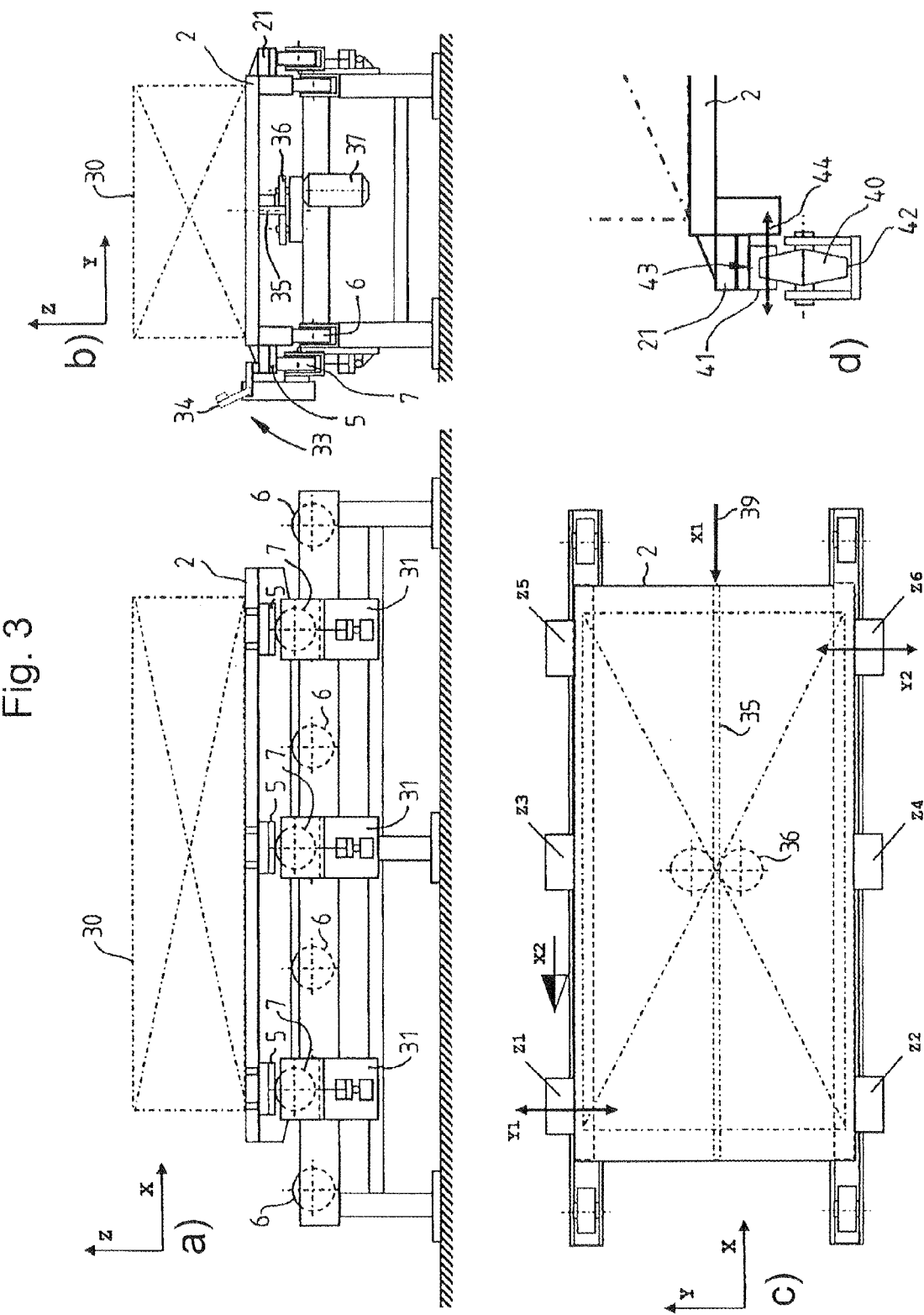

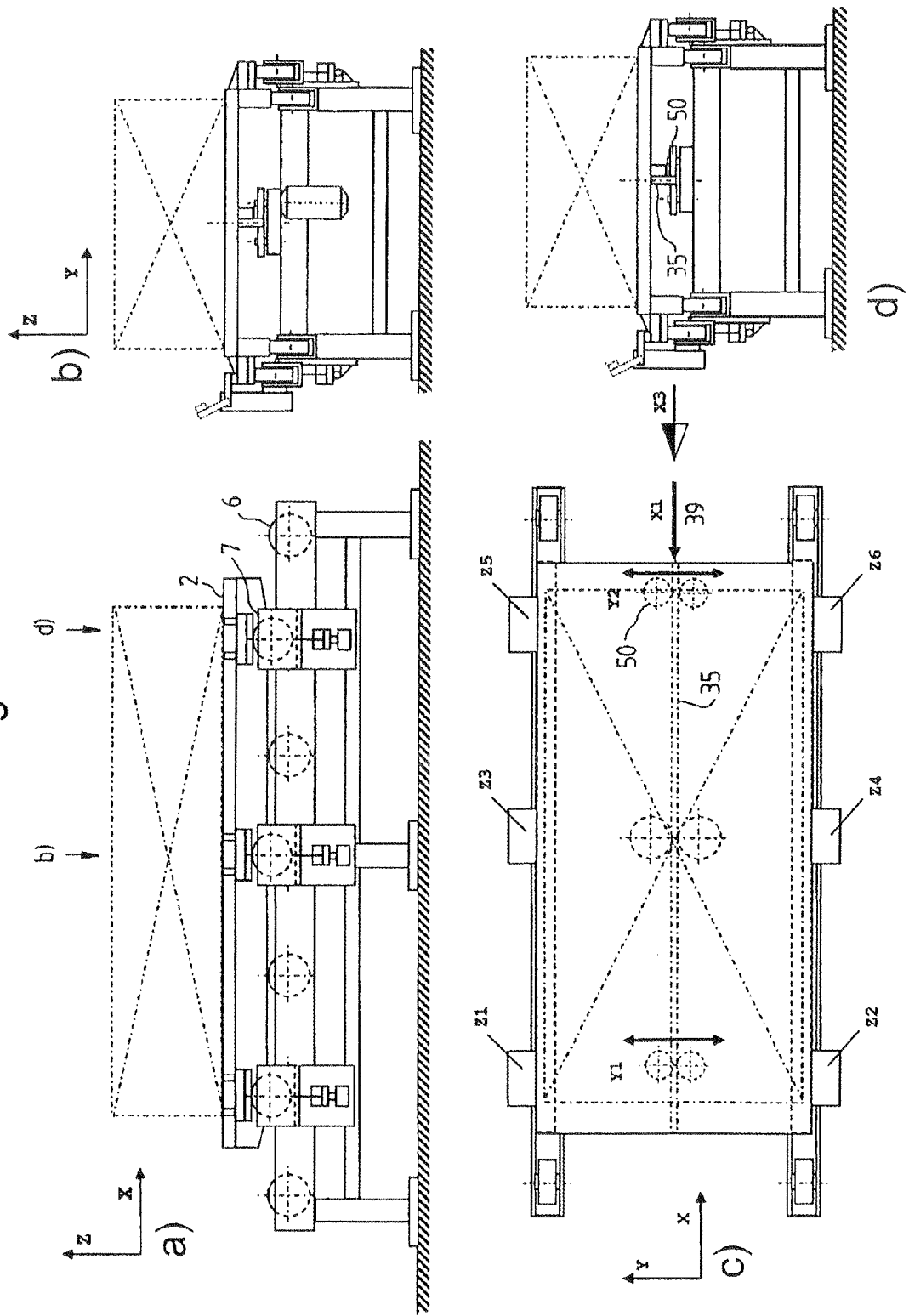

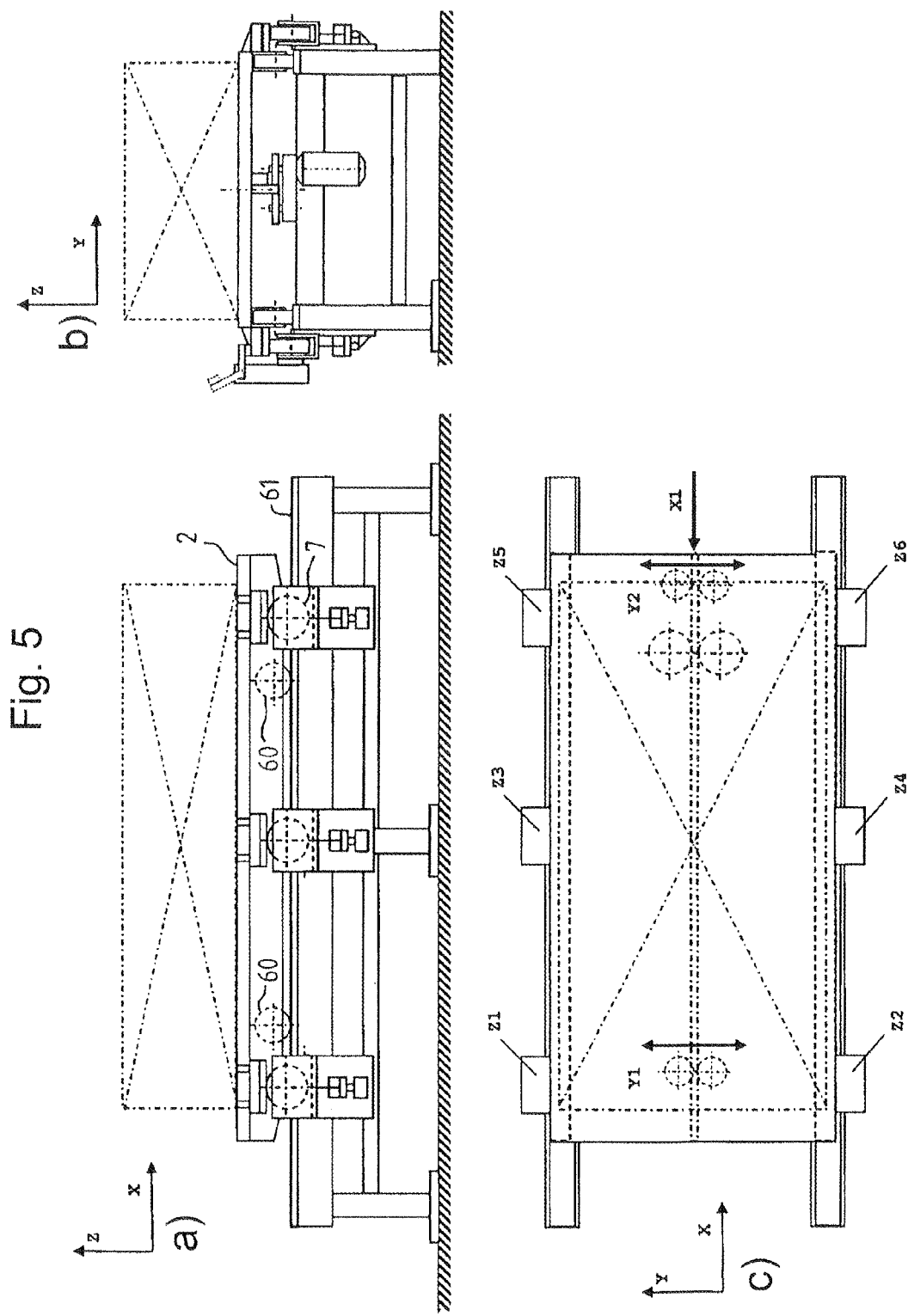

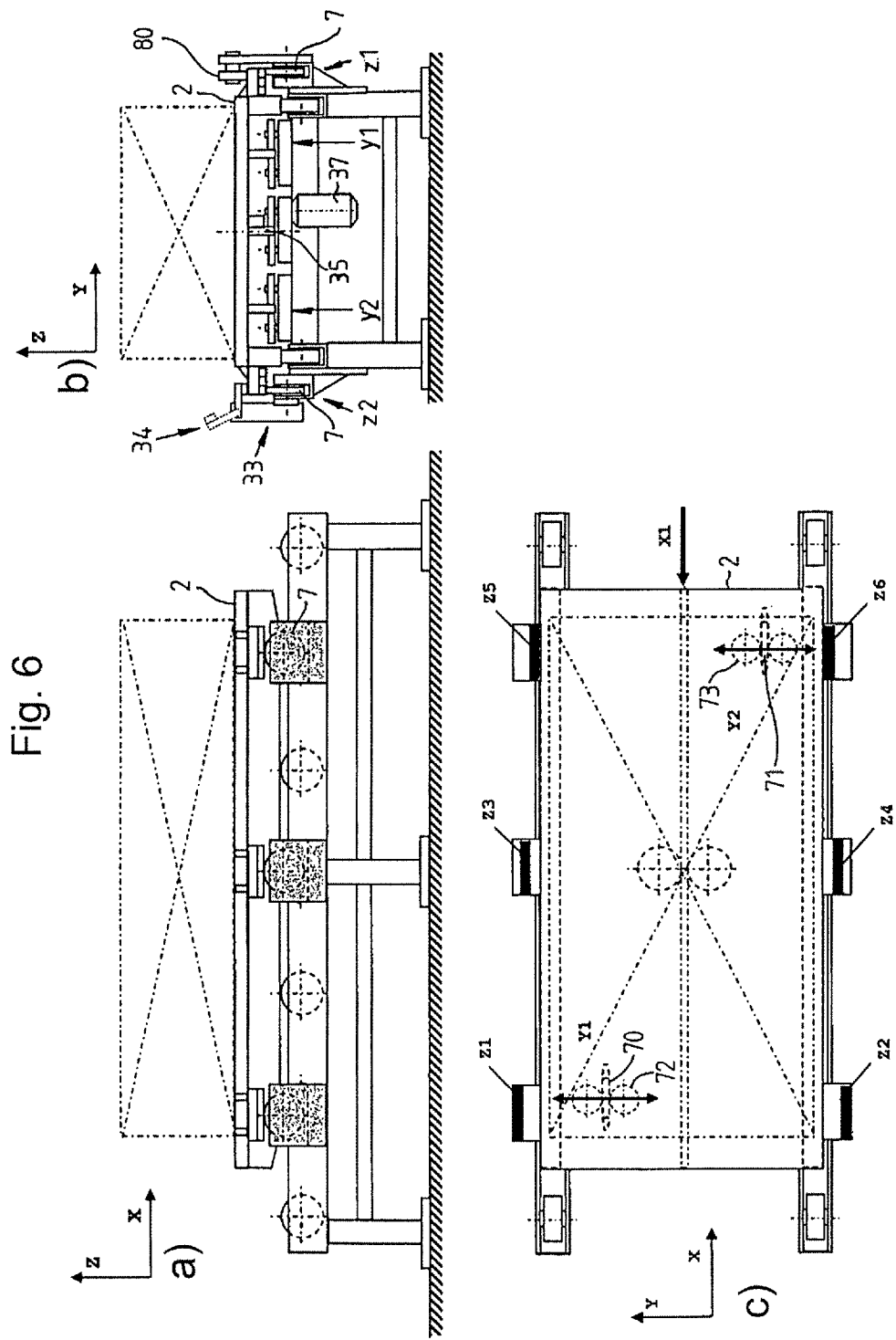

CONVEYING DEVICE FOR AUTOMATION PRODUCTION LINES

CROSS REFERENCE TO RELATED APPLICATIONS

This application is a continuation of International Application No. PCT/EP2011/001974 filed Apr. 19, 2011, which designated the United States, and claims the benefit under 35 USC §119(a)-(d) of German Application No. 10 2010 015 618.3 filed Apr. 19, 2010, the entireties of which are incorporated herein by reference.

FIELD OF THE INVENTION

1. Background of the Invention

The invention relates to a conveying device for the transport of components or component groups from and to one or more workstations on an automation production line.

2. Description of Related Art

Particularly in what is known as the carcass assembly of vehicle bodies, the various body parts are connected to one another at a plurality of workstations with the aid of robots by means of spot welds or other connection methods. The robots are in this case programmed such that they make their connections at exactly defined space coordinates. The task of a conveying device which makes the individual components or component groups available at the workstations is to guide the components or component groups accurately often to a fraction of millimeters, exactly to the correct location, so that the coordinates stipulated for the robots and the position of the workpiece composed of components or component groups coincide as exactly as possible. The positioning of the workpiece in this case takes place along three space directions X, Y, Z in that a component carrier truck, as an integral part of the conveying device, is brought into alignment. The component carrier truck in this case travels into the workstation and then has to be brought into alignment along its direction of movement (X) transversely to the direction of movement (Y) and vertically (Z).

Plants are known from the prior art in which the component carrier truck, which is mostly moved on a roller conveyor or travels itself via its own rollers on a rail track, is stopped and is then lowered onto a positioning template or lifted from this via lifting devices.

However, this operation is highly time-consuming and consequently inhibits the requirement for ever shorter cycle times per workstation during the run through a production line. This is a disadvantage particularly since the positioning operation is not available usefully as machining time.

One solution from the prior art of DE 20 2007 005 034 U1 is to initiate positioning at least partially by means of the travel-in operation itself, in that individual run-on rollers run onto run-on skids and at the same time perform Z-positioning. The problem of arrangements of this type, however, is that all the run-on rollers travel over all the run-on skids when the component carrier truck is travelling in, thus giving rise to a kind of "railroad effect" which leads to increased vibration, wear and an intensified generation of noise.

SUMMARY OF THE INVENTION

The object of the invention is to make available a rapidly operating and accurately positioning conveying device which avoids the disadvantages of the prior art.

The invention makes it possible to reduce the transport time of conventional systems considerably, since the positioning of the component carrier truck in all three directions (X/Y/Z) takes place as a result of the transport movement. Lowering or lifting for fixing purposes is unnecessary. Furthermore, by virtue of the conceptual set-up of the system, the acceleration or deceleration and therefore the overall transport speed can be increased.

The invention is a conveying device for the transport of components or component groups from and to one or more workstations, the conveying device comprising a conveying track and a component carrier truck moved on the conveying track. Positioning devices are provided on the conveying track in the region of the workstations and cooperate with positioning means on the component carrier truck in such a way that a desired position of the component carrier truck in the workstation is assumed in all three space directions (X, Y, Z) directly as a result of the travel-in movement of the component carrier truck into the workstation. The invention is characterized in that, during the entire travel-in movement of the component carrier truck into the workstation, each positioning means on the component carrier truck comes into contact with only its corresponding positioning device, determining the desired position, on the conveying track.

This avoids multiple travels over individual positioning means or positioning devices, since only the respective pair of positioning means and positioning device which is responsible for the corresponding positioning at this location and/or in this space direction comes into mutual contact.

The advantageous versions given in the dependent claims and also expedient developments of the conveying device according to the invention are explained in more detail in the following exemplary embodiments. However, the invention is not restricted to the embodiment shown. On the contrary, it embraces all those embodiments which make use of the idea which is claimed in each case and is essential to the invention.

BRIEF DESCRIPTION OF THE DRAWINGS

FIG. 1 shows a side view of a diagrammatic workstation with a component carrier truck traveling in;

FIG. 2 shows a top view of a diagrammatic workstation with a component carrier truck traveling in;

FIGS. 3a-d show various views of a conveying system according to the invention with positioning rollers on a lifting unit with bevel-type Y-positioning;

FIGS. 4a-d show various views of a conveying system according to the invention with positioning rollers on a lifting unit with strut-type Y-positioning;

FIGS. 5a-c show various views of a conveying system according to the invention with a component carrier truck having rollers;

FIGS. 6a-c show various views of a conveying system according to the invention with offset-arranged positioning rollers and with diagonal strut-type Y-positioning;

DETAILED DESCRIPTION OF THE INVENTION

Figure 7:
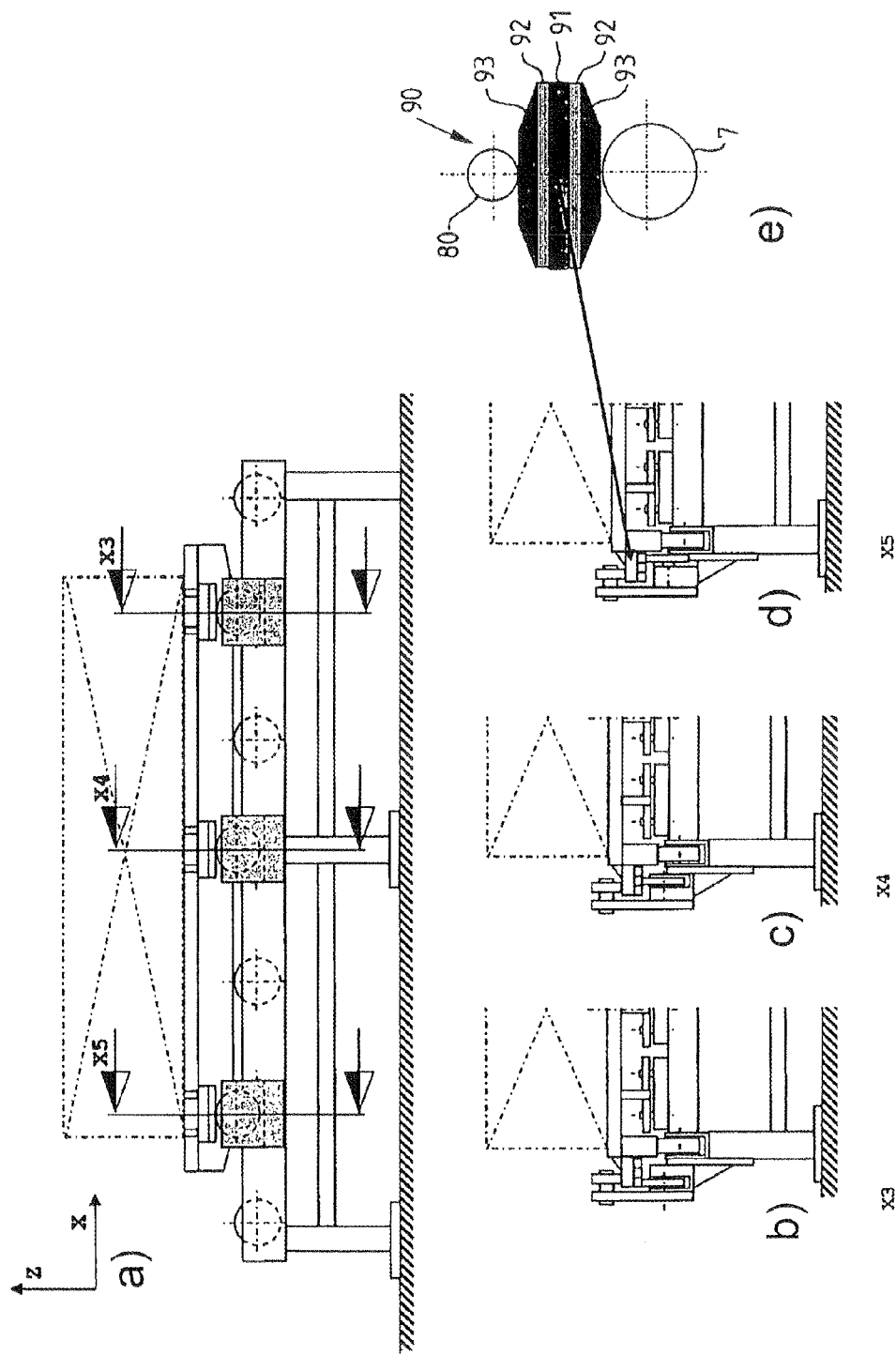
FIGS. 7a-e show a side view and sectional illustrations of a conveying system according to the invention with offset-arranged positioning rollers.

The exemplary embodiments illustrated show various technical details of the conveying device according to the invention, although these are not conclusively restricted solely to the exemplary embodiment shown, so that the different positionings can in each case be independently interchanged and implemented in the individual embodiments, insofar as is technically possible and expedient, by means of different positioning devices and positioning means, in order to fulfill the correspondingly required positioning and to be adaptable to possibly already existing plant technology.

Furthermore, equivalent parts are given the same reference symbols throughout, without being mentioned once more in particular in the respective figure descriptions.

To illustrate the space direction more clearly, coordinate axes are added to the individual figures, insofar as is necessary.

FIG. 1 shows a diagrammatic side view of a conveying device 1 according to the invention in which a component carrier truck 2 travels on a roller conveyor 3 into the region of a workstation 4. The roller conveyor leading to the workstation 4 is not illustrated in the present case.

The component carrier truck 2 comprises on its underside Z-supports 5 which fulfill different positioning tasks according to their respective position. The component carrier truck 2 travels on the roller conveyor 3 via conveying rollers 6 into the workstation 4 until the Z-supports 5 can cooperate, shortly before reaching their end position, with positioning rollers 7.

According to their arrangement on the component carrier truck 2, the Z-supports 5 cooperate in each case only with their positioning roller 7 responsible directly for their positioning, so that what is achieved in the conveying device 1 according to the invention is that, when the component carrier truck 2 travels over the roller conveyor 3, no contact takes place between the Z-supports 5 and positioning rollers 7 which do not correspond to one another.

The purpose according to the invention is achieved in this case in the diagrammatically illustrated version of the conveying device 1 in FIG. 1, in that the positioning rollers 7 are first lifted slightly by a lifting unit 10 via a toggle lever mechanism 8 and a drive device 9 shortly before the end position is reached, so that they are transferred from a first placement lying below the conveying rollers 6 into a second placement lying above the conveying rollers 6 and thus come into contact with the respective Z-supports 5 of the component carrier truck 6.

FIG. 2 shows a top view of a diagrammatic illustration of a conveying device 1 according to the invention, the state corresponding essentially to the illustration from FIG. 1.

The component carrier truck 2 has, outside its longitudinal bearers 20, extension arms 21 which carry the Z-supports 5. It would also be conceivable, however, to arrange the Z-supports 5 on the inside of the longitudinal bearers on extension arms, for this would not militate against the basic function. The component carrier truck 2 travels onto the roller conveyor 3, at the same time running with its longitudinal bearers 20 on conveying rollers 6. According to the position of the extension arms 21, an arrangement of positioning devices which comprise the positioning rollers 7 is provided in the workstation 4 next to the roller conveyor 3. In this case, the respectively illustrated positioning devices Z1 to Z6, Y1, Y2, X1 are responsible for positioning in the respective space direction. The individual positioning devices provided are explained in more detail below.

FIG. 3 shows a further diagrammatic illustration of a version according to the invention of a conveying device 1, FIG. 3a illustrating a side view, FIG. 3b a sectional illustration viewed longitudinally and sectioned through the middle positioning device, FIG. 3c a top view and FIG. 3d a view of a detail of the Y-positioning.

FIG. 3a illustrates the component carrier truck 2 with a component 30 arranged on it, as it has traveled into the workstation 4 and is positioned completely. The positioning roller 7 have in this case been moved out correspondingly along the vertical Z-direction by lifting cylinders 31 as an actuator (drive device 9), so that the Z-supports 5 have traveled onto the positioning rollers 7. The component carrier truck 2 is thus lifted off from the conveying rollers 6, although this distance may amount to only a few millimeters. By virtue of the adopted system, owing to the very short Z excursions (approximately 1-5 mm), further process movements (for example, the penetration of a robot or a further movement from outside) can be started at an early stage, and this may likewise lead to a further reduction in cycle times.

FIG. 3b shows an illustration in a front view, the illustration corresponding to a section through the plane of the middle positioning roller 7. The component carrier truck 2 has in this case traveled onto the positioning rollers 7, Z-positioning being predetermined by the vertical arrangement of the positioning rollers 7. The Z-support 5 in this case lies on the positioning rollers 7, the Z-support 5 being arranged below the extension arms 21. Optionally, there may be provision, in the region of the positioning rollers 7, for securing the extension arms or Z-supports from above by a tension means 33 which may be designed, for example, in the form of a toggle lever (clamping mechanism 34), so that the Z-position is also fixed vertically upward, and, for example, vibrations during machining cannot cause any inaccuracy in the Z-direction. Alternatively, and described later, a tension roller may also be provided.

In the present case, the component carrier truck 2 is driven by means of a friction-roller/strut combination, a longitudinal strut 35 being provided on the underside of the component carrier truck 2. The longitudinal strut 35 has penetrated into a region between two friction rollers 36 which are driven in rotation via a motor 37 and have been fastened to the conveying device, in particular to the roller conveyor 3. The advantage of a strut-type drive of this type is that an offset in the Z-direction, which occurs as a result of the Z-positioning, is unimportant, since the depth of penetration of the strut 35 between the friction rollers 36 is variable, without the corresponding drive action being lost.

The component carrier truck is designed such that transport both by means of the strut-type drive system and by means of conventional roller conveyor systems with driven conveying rollers is possible. If roller conveyor systems are used, only a short piece of the linear strip and a set of friction wheels are required.

FIG. 3c shows a top view of the corresponding arrangement, the individual positioning arrangements Z1 to Z6, Y1, Y2 and X1 being illustrated. The X-positioning is in this case designed as a stop 39 which is arranged at the front end in the direction of movement of the component carrier truck 2. The stop 39 is not illustrated in any more detail in the present case. However, corresponding stop arrangements are known from the prior art.

The positioning along the Z-direction takes place by means of the individual extension arms 21 with the corresponding Z-supports 5 at the locations Z1 to Z6 by travel onto positioning rollers 7. In addition, at the location of the positioning means Z1 and Z6, a respective Y-positioning Y1, Y2 is provided which is described in more detail in the following exemplary embodiment of FIG. 3d.

FIG. 3d shows a view of a detail of the Y/Z-positioning at the location Y1, Z1 and Y2, Z6. In this case, there is provision for the positioning roller 7 to be designed as a bevel roller 40 which, on the one hand, at a Y/Z-support 41 provides Z-positioning by travel onto the roller surface 42 and, on the other hand, achieves positioning the Y-direction by means of a corresponding depression 43. The engagement of the bevel roller 40 into the depression 43 of the Y/Z-support constitutes in the Y-direction a Y-form fit 44 which, in the case of correspondingly accurate manufacture of the depression 43 and the bevel shape of the bevel roller 40 adapted thereto, achieves sufficient accuracy in the Y-positioning during travel onto these positioning rollers.

FIG. 4 shows a further illustration of a refinement of the conveying device according to the invention. FIG. 4a corresponds to the arrangement having lifting cylinders which is described in FIG. 3a. The views which are shown in each case longitudinally in FIGS. 4b and 4d are illustrated along the sectional directions b) and d).

FIG. 4b shows the already described version with a friction wheel drive on a longitudinal strut below the component carrier truck 2.

FIG. 4c makes available a further arrangement of possible Y-positioning in which the strut 35 is guided in the longitudinal direction at the front and the rear end region of the component carrier truck 2 in pairs of Y-rollers 50. During travel into the workstation, the strut is introduced into the pairs of rollers 50, so that these predetermine an exact position along the Y-direction for the strut. The arrangement at the end region affords simpler and therefore more exact positioning, since the center of rotation of the entire arrangement lies essentially at the center of the component carrier truck 2.

FIG. 4d shows a sectional illustration of Y-positioning at the longitudinal strut 35. The pair of Y-rollers 50 in this case receives the longitudinal strut 35 centrally and guides the latter into a desired predetermined exact position. Vertical offset caused by travel onto Z-supports is unimportant here, just as in the case of the drive at the longitudinal strut.

FIG. 5 shows a further refinement of the conveying device 1 according to the invention, in the present case the component truck 2 not being equipped as a component truck moved on a roller conveyor 3, but instead having itself, on its underside, running rollers 60, by means of which it is mounted in a traveling manner on rails 61. The drive and also Y-positioning and Z- and X-positioning correspond to the preceding exemplary embodiments.

FIG. 6 shows a further version of the conveying device 1 according to the invention, FIG. 6 illustrating an alternative version of the arrangement of the Z-positioning rollers and of Y-positioning.

FIG. 6a shows the side view already illustrated several times, in the present case no actuators for moving the Z-positioning rollers 7 in the vertical direction being provided.

The exemplary embodiment according to the invention shown in FIG. 6 is made even clearer in terms of its technical function by the illustration of FIG. 6c. As may be gathered from FIG. 6c, the Z-positioning rollers 7 in the positions Z1 to Z6 are in each case arranged so as to be offset slightly along their roller axis, so that the Z-positioning rollers 7 in the positions Z5 and Z6 lie nearest to the longitudinal bearer 20 of the component truck 2 and the positioning rollers 7 in the positions Z1 and Z2 are at the greatest distance along their axis from the longitudinal bearer 20 of the component carrier truck 2. The positioning rollers 7 in the positions Z3 and Z4 are arranged so as to lie in between.

The Z-supports 5 on the extension arms 21 are in each case arranged correspondingly as narrow support strips, so that, when the component carrier truck 2 travels into the workstation 4, the respective Z-support 5 comes into contact only with the associated positioning roller 7 for the end position. The arrangement of the positioning roller 7 along its axis is thus assigned unequivocally to the corresponding support 5.

For the X-positioning, a stop, not illustrated in any more detail, is provided once more.

As Y-positioning, on the one hand, it is conceivable to have a bevel roller 40 in the form of the illustration from FIG. 3d, but on the other hand, in the present case, a variant of Y-positioning in the form of double rollers 50 along the longitudinal strut 35 is also possible. A further possibility for Y-positioning may also be provided in the illustrated positions Y1 and Y2, in that additional positioning means in the form of longitudinal struts 70, 71 are provided along the diagonal on the underside of the component carrier truck 2, which travel into corresponding positioning devices in the form of pairs of rollers 72, 73 and thus provide exact Y-positioning. Y-positioning can thereby be achieved independently of the presence of a middle longitudinal strut 35.

FIG. 6b shows an illustration of a longitudinal projection in the front view, in which both the friction roller drive is formed at a middle strut 35 via the motor 37 and the corresponding Y-positionings Y1 and Y2 are arranged along the diagonal of the component carrier truck 2. The clamping lever-mechanism 34 (toggle lever) shown already in FIG. 3b is illustrated in the present case, as an example, on the left side of FIG. 6b as tension means 33 at the Z-positioning, Z-fixing via a counter roller 80 being provided alternatively, as a further embodiment, on the right side. A Z-support positioning set composed of the extension arm 21 and Z-support 5 in this case travels in between the positioning roller 7 and the counterroller 80, so that an upward deviation in position vertically is also prevented by the counterroller 80, for example when vertical forces act upon the component 30 and consequently upon the component carrier truck 2 by means of corresponding robots in the region of the machining station 4.

FIG. 7 shows a lateral illustration of an arrangement according to the invention with three offset Z-positioning rollers 7 according to FIG. 6b in positions Z2, Z4 and Z6.

FIG. 7 shows the side view with the illustration of the corresponding sectional planes X3, X4 and X5.

FIGS. 7b, 7c and 7d show the respective arrangement of the corresponding Z-positioning roller 7 which is in contact with the Z-support 5 assigned in each case.

FIG. 7e shows a more detailed view of a Z-support set 90 used in which a counterroller 80 has been illustrated. The Z-support set 90 in this case comprises a bearer 91 which may correspond, for example, to the extension arm 21. Adjusting plates 92 are placed onto the bearer 91 both on its top side and on its underside and make it possible to adjust exactly so as to achieve desired positioning. Furthermore, the Z-support set 90 comprises both on its top side and on its underside a supporting ramp 93 which serves for travel onto the Z-positioning roller 7 or which makes it easier to travel in between the Z-positioning roller and the counter roller 80. It is also basically conceivable that the corresponding Z-support sets 90 are shaped with a depression 43, so as to achieve a Y/Z-support, as illustrated in FIG. 3d. In the version with tension means in the form of a counterroller 80, the spacing between the Z-positioning roller 7 and the counterroller 80 and the thickness of the Z-support set 90 between them are coordinated exactly with one another such that no further offset in the Z-direction is possible.

Figure 8:
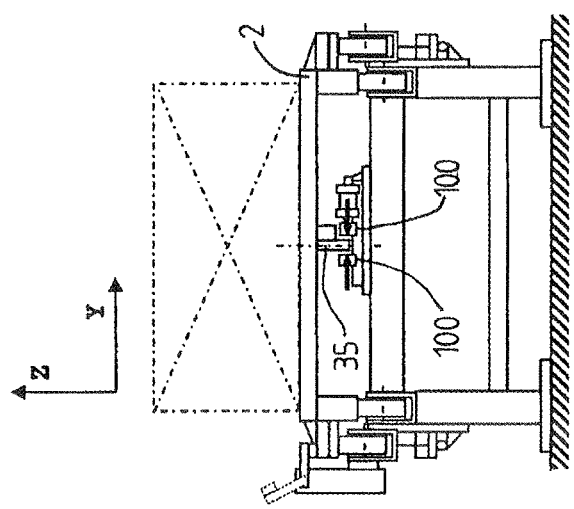
FIG. 8 shows a longitudinal view of a conveying system according to the invention with alternative X-positioning.

FIG. 8 shows a further alternative of X-positioning without the arrangement of a stop. Alternative X-positioning is in this case achieved by means of clamping jaws 100 which engage, for example, on the longitudinal strut 35 on the component carrier truck 2 or which grasp strut arrangements provided specifically for this purpose. Exact positioning can in this case be achieved by means of an exact holding position by the drive control, for example by a servomotor, so that the position simply has to be fixed by means of the clamping jaws 100. However, for example, arrangements of dowel pins may also be provided, which engage into vertically arranged long holes of the strut 35 and thus fix exact positioning along the X-axis, without possible displacement along the Z-axis as a result of Z-positioning being prevented.

Figure 9:
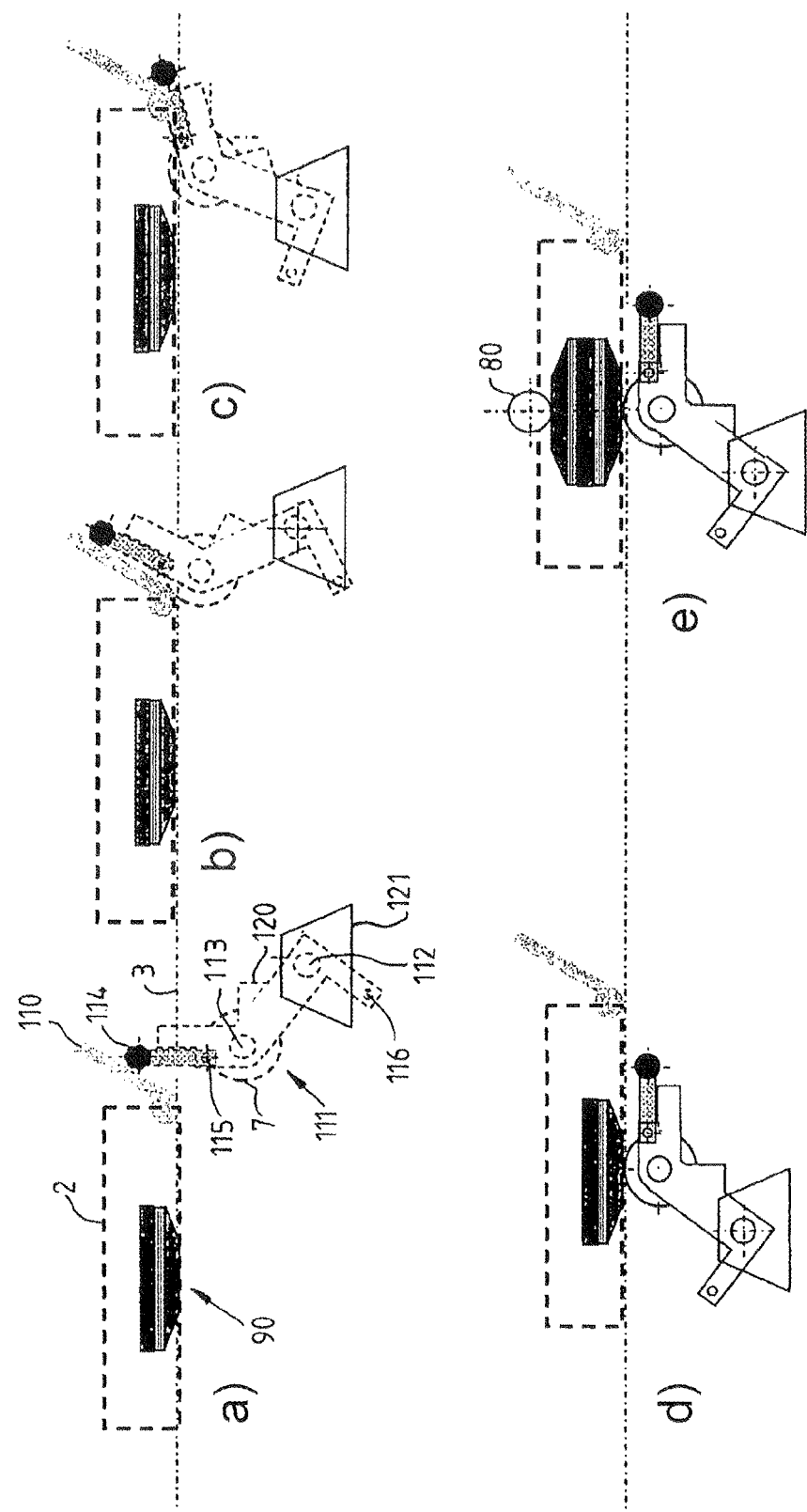
FIGS. 9a-e show various snapshots of the travel-in sequence of one version of a positioning device according to the invention.

FIG. 9 shows a moreover expedient refinement according to the invention of the Z-positioning arrangement, this also being implementable for corresponding Z/Y-positioning, as illustrated in FIG. 3*d*.

FIGS. 9*a* to 9*e* show the sequence of a traveling-in operation in snapshots of a component carrier truck 2 with corresponding Z-supports 5, in the present case only one Z-support 5 at a positioning roller 7 being illustrated, which, as the purpose according to the invention demands, is activated only when the required contact for positioning is immediately imminent.

The device according to the invention in this case comprises on the component carrier truck 2 an actuator 110 which precedes the Z-support set 90. According to the offset arrangement of the Z-positioning rollers, as illustrated in FIGS. 6 and 7, the actuators 110 and the Z-support sets 90 and also the positioning rollers 7 may also be arranged so as to be offset in the version of FIG. 9, as illustrated by way of example in the present case.

The Z-positioning roller of FIG. 9 has in this case a lever joint 111 which is arranged rotatably about an offset joint bearing 112 lying at a lower level in relation to said roller. The lever joint 111 carries a roller bearing 113 or a roller shaft, on which the positioning roller 7 is arranged rotatably. FIG. 9*a* shows a vertical first state of the lever joint 110, in which an activating lever 114 can be operated in an upper region by the actuator 110. The activating lever comprises a rocker joint 115 which causes it to deviate correspondingly in the event of a return travel of the component carrier truck 2.

The lever joint 110 has at is lower end a receptacle 116 for restoring means, for example a restoring spring which is not illustrated in any more detail in the present case. The receptacle 116 moves upward when the lever joint 110 is reversed, so that corresponding tensioning of a restoring means can be generated.

During the sequence of movement according to FIGS. 9*a* to 9*d*, the lever joint 111 is now reversed by the actuator 110 which bears against a stop on the lever joint. The positioning roller 7, which lies below the plane of the roller conveyor 3 in a first vertical state (corresponding to FIG. 9*a*), is moved eccentrically upward as a result of the reversal of the lever joint 111, so that said roller, in a second horizontal state (FIG. 9*d*), projects at least minimally out of the plane of the roller conveyor 3. The Z-support set 90 can thus travel onto the positioning roller 7 and exact Z-positioning can be achieved.

The lever joint 111 comprises a stop 120 which, when the horizontal position is reached, impinges onto a plinth 121 or corresponding counterstop and thus stops the movement of the positioning roller 7.

What is likewise achieved thereby is that the Z-supports are locked in the end position as a result of the gravitational force of the component carrier truck. The corresponding supports composed of a lever joint 111 can likewise be set via shims, so that the support height in Z, occurring via the roller 7, can be adapted individually.

FIG. 9*e* shows a version of Z-positioning with a lever joint 111 according to the invention, a counterroller 80 also being illustrated in the present case as an upper tension means, while the Z-support set 90 can be positioned directly between said counterroller and the positioning roller 7 during travel into the workstation.

Figure 10:
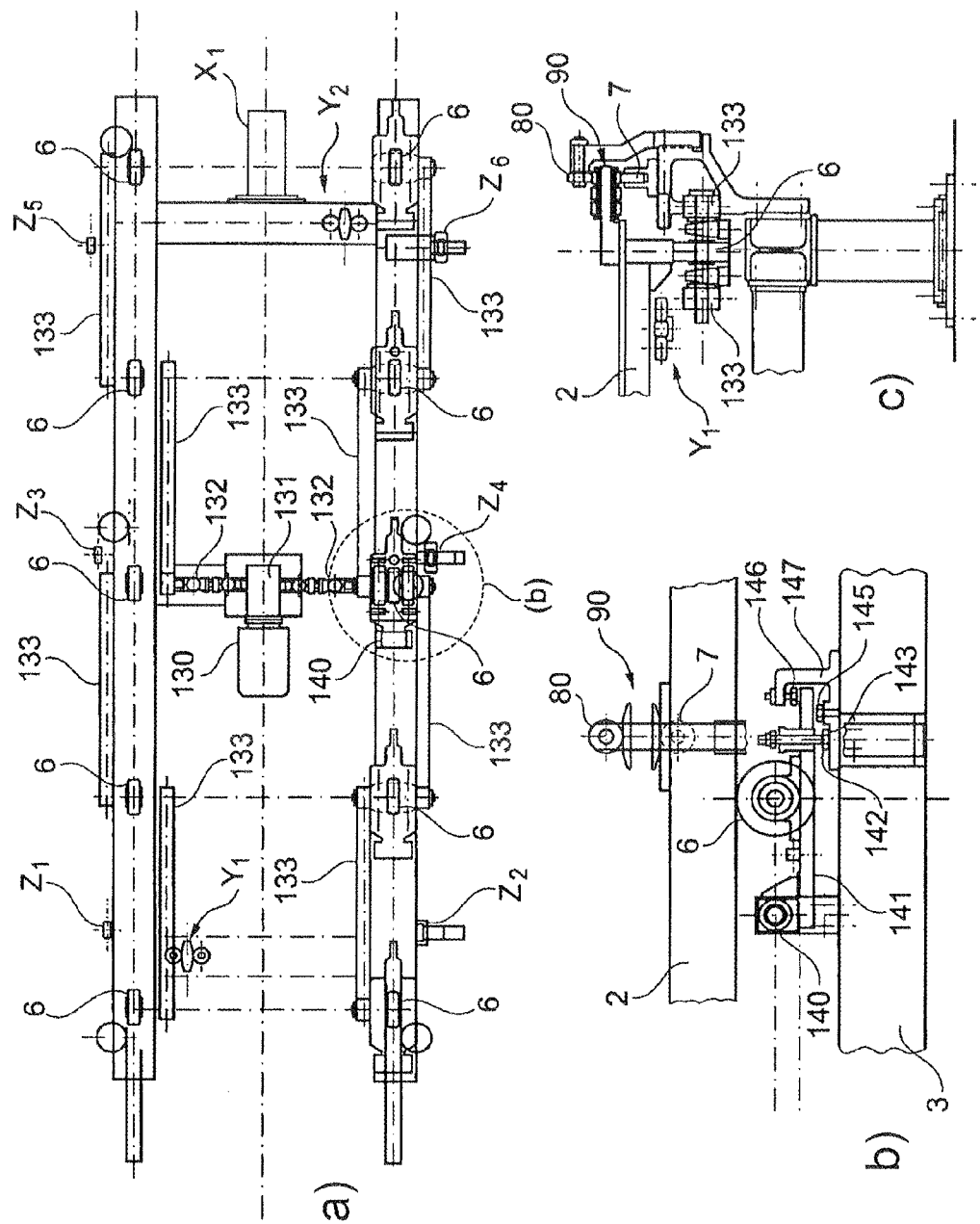
FIGS. 10a-c show a top view and sectional illustration of a conveying system according to the invention with driven sprung conveying rollers.

FIG. 10*a* shows a top view of a conveying device according to the invention with driven sprung conveying rollers 6. The conveying rollers are driven via a combination of a drive motor 130 which acts as a drive upon the middle conveying rollers 6 via a transmission 131 and cardan joints 132. Furthermore, belts 133 are fastened to the drive shaft and set the other conveying rollers 6 in rotation via corresponding further drive shafts. Belts make it possible to have an offset in Z-height by means of the sprung drive rollers described below. The drive belts are in the present case arranged, offset, on the roller conveyor on the outside and inside, but may also be provided in another way on the rotatable drive shafts.

The conveying device shown likewise has Z-positionings Z1 to Z6, the described Y-positionings Y1, Y2 in the form of a longitudinal strut between two positioning rollers, and an X-stop, not illustrated, pivotable inwardly in front of the component carrier truck 2, in the position X1 likewise shown several times above.

A pivotable Z-positioning roller is illustrated in more detail, by way of example, at the location (b) and will be explained further in the enlarged illustration from FIG. 10*b* later. This sprung conveying roller 6 is suspended pivotably on a pivot bearing 140 and makes it possible, when a component carrier truck 2 travels in, for the latter to be driven by the conveying rollers 6, even when it travels onto corresponding Z-positioning rollers for exact positioning, since the rollers follow the executed stroke in the Z-direction. When it travels onto the corresponding positioning units, the component carrier truck is lifted slightly in its Z-position, so that the conveying rollers 6, which then serve as a drive, also have to execute this stroke in order, as before, to be pressed sufficiently strongly against the component carrier truck in order to have the necessary static friction for the rapid movement and braking of the component carrier truck 2.

The drive via cardan joints is necessary so that a corresponding Z-offset of the conveying rollers 6 can take place by means of the sprung suspension on the pivot bearing 140, without a corresponding Z-height offset having to occur by means of the complete drive unit.

FIG. 10*b* shows a detail in a lateral projection of the sprung conveying rollers 6, which has been marked in FIG. 10*a* by reference symbol (b). The pivot bearing 140 is fastened to the bearer of the roller conveyor 3 and on an extension arm 141 carries the conveying roller 6 in its roller bearing. The extension arm 141 has at its front end a receptacle for a spring with a corresponding spring tension screw which makes available a pressure force in the Z-direction, that is to say directed upward. In the present case, the pressure force may lie in the region between 200 N and 1000 N, preferably between 300 N and 800 N. To adapt the pressure force, the spring 142 is prestressed correspondingly via the screw 143, so that, when the component carrier truck 2 travels onto the conveying roller 6, the spring makes available the required counterforce. The extension arm 141 is supported at its foremost end downwardly in the Z-direction by a lower stop 145 and is limited upwardly in its freedom of movement by an upper stop 146, so that, when no component carrier truck 2 is lying on the conveying roller 6, the conveying roller dwells in a restricted pivoting position upward about the bearing 140. The two stops 145 and 146 are arranged in a profile 147 which is likewise fastened to the bearer of the roller conveyor 3. Likewise illustrated in the present case, by way of example, is the Z-positioning with a Z-positioning roller 7, with a Z-support and with a corresponding counterroller 80, as already described several times above.

FIG. 10c shows a top view in the direction of movement of the component carrier truck 2, the corresponding detail of the illustration (b) not having been selected in the present case, but instead an illustration with nearby Y-positioning in the form of a pair of Y-rollers 50 on a longitudinal strut being shown. Z-positioning likewise takes place via a Z-positioning roller 7 and a corresponding counterroller 80, in the present case the Z-positioning supports being illustrated, offset next to one another, in order to provide the individual Z-positioning at different locations Z1-Z6 by means of different supports, as already explained in FIGS. 6 and 7. The conveying roller 6 illustrated here is driven by belts 133 or transfers its drive power to another follower roller via the corresponding further belts.

Figure 11:
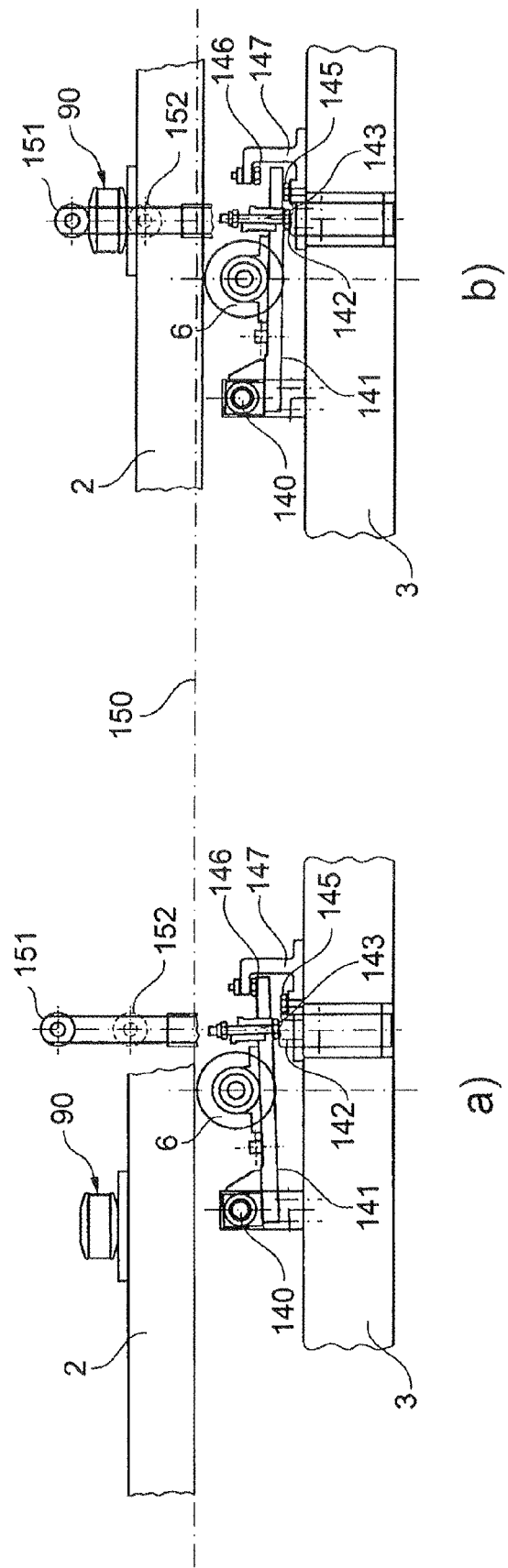
FIGS. 11a-b show a modified embodiment of the Z-positioning of the conveying system according to the invention with sprung conveying rollers.
Figure 12:
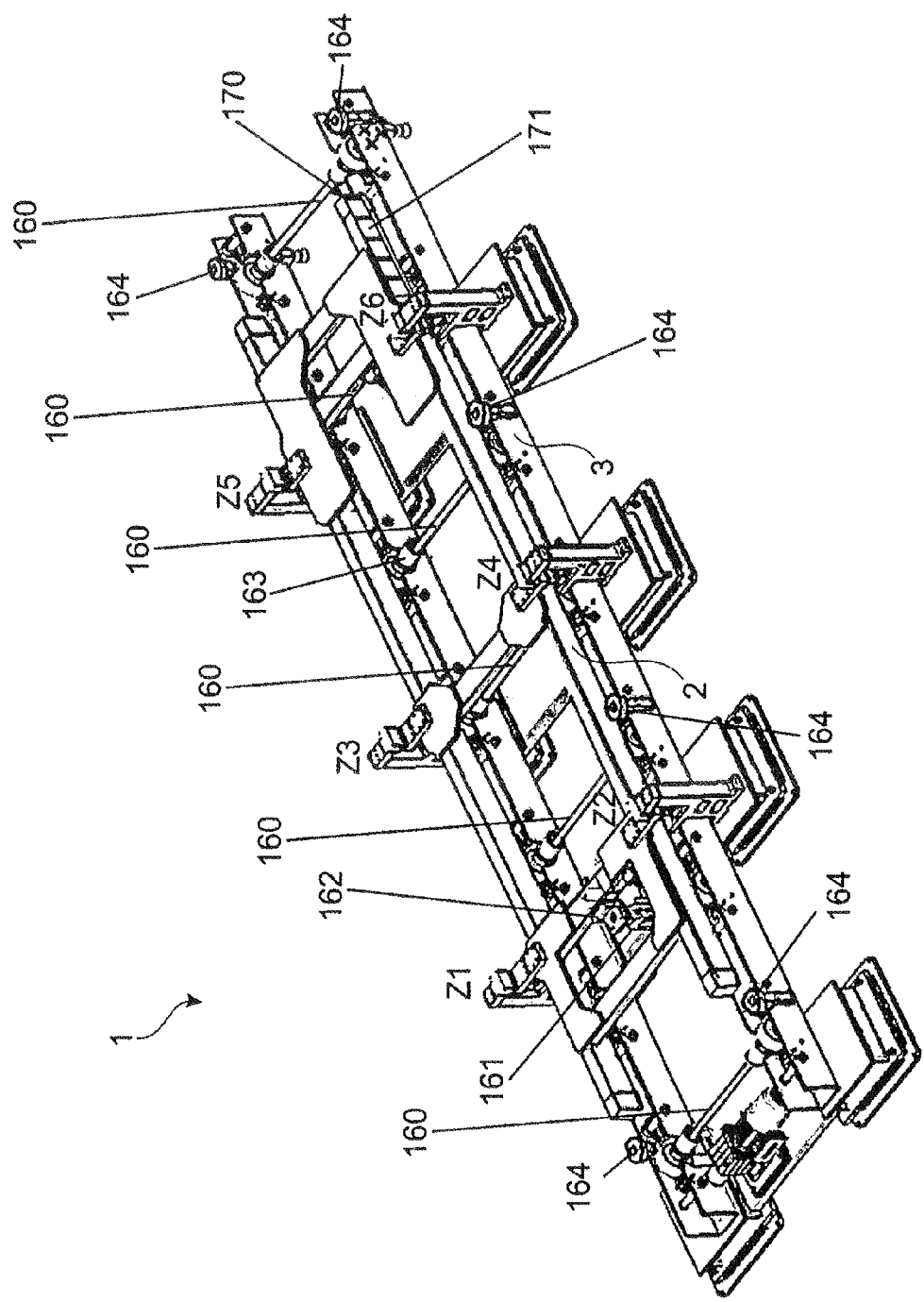
FIG. 12 shows a perspective illustration of a conveying system according to the invention with a partially illustrated component carrier.

FIGS. 11 a) and b) show in the form of a detail a side view of a conveying device according to the invention with driven sprung rollers. The system differs from the version, as already shown under FIG. 10, in that the sprung drive conveying rollers 6 are designed with a continuous shaft 160 (described later in FIG. 12). The mounting of the drive rollers is in this case designed such that different Z-heights can be received at the drive rollers 6 (for example, during transport) as a result of the inclination of the bearing. The drive rollers themselves are in this case advantageously designed to be crowned on the running surface. By virtue of this refinement, the number of bearing points, belts and belt pulleys required can be reduced. Furthermore, as shown in FIG. 12, the belts may be arranged inside the system, with the result that the construction dimension of the overall system is optimized. Depending on the overall system requirements, a belt arrangement outside the system is also possible.

For Z-positioning, the component carrier truck 2 travels on a transport plane 150 into the positioning arrangement. The conveying roller 6 is held against an upper stop 146 via a pivot bearing 140 and a spring 142. However, a sprung position, without stop contact, may also be envisaged. When the component carrier truck 2 travels into the positioning arrangement, it is transferred into the position illustrated in FIG. 11 b). For this purpose, the Z-support set 90 travels in between the upper positioning roller 151 and the lower counter roller 152 and is pressed downward into a defined Z-position by the upper positioning roller 151. The guide roller (conveying roller 6) sprung in the pivot bearing 140 by the spring 142 deviates downward from the component carrier truck 2 and thus allows travel into the defined position to be reached. For this purpose, the extension arm 141 should have sufficient freedom of movement between the stops 145 and 146 to be able to permit the desired positioning in the Z-offset. In an embodiment not illustrated, the function of the lower counterroller 152 may also be assumed by the correspondingly strongly spring-loaded guide roller (conveying roller 6), so that the counterroller 152 does not have to be implemented.

FIG. 12 shows a further refinement according to the invention of the conveying device 1. In the present case, the conveying device 1 is illustrated by a partially illustrated component carrier truck 2. The roller conveyor 3 is likewise illustrated without arranged drive belts, in order to make it possible to illustrate the components according to the invention.

The illustration according to FIG. 12 shows continuous shafts 160 which are arranged between the conveying rollers 6 and are driven via a belt drive powered by motor 37. As a result of these shafts, only one drive coupling per pair of conveying rollers is necessary, thus simplifying the arrangement and making it more compact. The motor 37 and the belt arrangement of the belt guide 163 are in this case preferably designed such that the distance from the motor shaft to the drive shaft is, in particular, equal to the center of rotation (pivot bearing 140) of the sprung roller 6 with respect to its main bearing. This arrangement exerts no or only insignificant influence upon the belt length during the Z-movement of the drive roller.

In the present case, the component carrier truck 2 is equipped in the positioning locations Z1 to Z6 with positioning devices traveling in a downward direction, as described in FIGS. 11 a) and b). In addition, an X-position transmitter 161, which is arranged on the bottom or in the frame of the roller conveyor, is provided between the positioning devices Z1 and Z2. The position transmitter is preferably designed as a lifting cylinder with a centering tip which travels upward into a receptacle 162 for the X-postioning on the component carrier truck. The X-position can thus be finely adjusted and at the same time fixed.

One or more guide rollers 164 which guide the component carrier truck laterally may also be provided laterally on the roller conveyor 3. However, in an embodiment not illustrated, this guide may also be assumed by the Y-positioning means.

In a preferred embodiment, a code band 171 or similar data carrier means is arranged in an information region 170. The information region may in this case cover the frame of the component carrier truck 2 completely or partially. The position of the information region must advantageously be selected such that it can be seen by a reader (not illustrated) in the positioned state of the component carrier truck 2. The code band 171 (barcode, data matrix code or the like) may be used as means for X-positioning detection when it is attached to the component carrier truck in the end position so as to be capable of being read off. By means of a code reading system (for example, camera), which is mounted stationarily in the station, positioning can be carried out with an accuracy of fractions of a millimeter. This code band is preferably set up so as to be defined with respect to the component carrier truck, so that, when a plurality of carrier trucks are used, positioning in different stations is always the same.

In addition, unequivocal code markings may be attached in each case at the start (or else at the end) of the code band. The component carrier truck is thereby assigned an unequivocal number and can be identified. By means of the code band reader, the carrier truck number can consequently by read out even while the component carrier truck is traveling in, before the carrier truck comes into actual positioning.

This unequivocal marking gives rise to a plurality of advantageous refinements. On the one hand, there is no need for the code band to be set up with respect to the component carrier truck 2. The offset of the code band with respect to the component carrier truck 2 is determined once and is stored in the control. During travel into the station, the component carrier truck number is then read out and the corresponding positioning value retrieved. Code band fastening can thereby be simplified appreciably. On the other hand, the respective workpiece can be identified even when the component carrier truck is in the process of the travel-in movement. For this purpose, at the loading point of the carrier truck, the workpiece (for example, a specific component or body type) is stored electronically, along with the number of the carrier truck, in the control. All further machining stations in the production system can have access to this central information. A modification of this version may also be envisaged, to the effect that the data are not held completely decentrally, but instead a check of the workpiece and carrier truck takes place on each production section in each case in the first station and this information is available only in the respective production section. Complicated decentral data holding may therefore be dispensed with. The advantage of linking the workpiece data to the component carrier truck is that, on the one hand, the recognition of the corresponding workpiece takes place as early as during the travel-in movement and the setting-up times or feed movements of the machining tools can take place earlier. This leads to an increase in useful work time. On the other hand, the hitherto complicated identification systems of the workpiece or of the component carrier truck 2 in the respective workstation may be dispensed with, thus leading to a cost saving. Workpiece recognition and the positioning of the carrier truck take place by means of the same code band reading system. Thus, in combination with the motor transmitter and the continuous code band on the component carrier truck, further otherwise customary initiators for, for example, the component carrier truck follow-up, overrun, travel trigger, etc. may also be dispensed with.

A further advantage of code band positioning is positioning in different placements in the machining station. Each X-position of the component carrier truck can be obtained by means of the existing code band reader with the same accuracy as at the machining location itself. This advantage may be used, for example, for loading further workpieces on the component carrier truck. Machining, such as, for example, welding out of bodies, in different X-positions may also be envisaged. It is thereby possible to dispense, for example, with movement axes of robots or the like. The X-position can be held both by regulating the motor and by applying a motor brake.

In the event of major forces upon the system, marking-out pegs/position transmitters 161 or stops, such as conform to the prior art, may also be used additionally.

As already stated, the individual constituents of the device according to the invention are not restricted, insofar as is technically possible, to their combination illustrated in the figures. On the contrary, all those embodiments are claimed which are implemented in the back references of the patent claims and which present themselves as advantageous versions and expedient developments.

LIST OF REFERENCE SYMBOLS

1 Conveying device
2 Component carrier truck
3 Roller conveyor
4 Workstation
5 Z-support
6 Conveying roller
7 Positioning roller
8 Toggle lever
9 Drive device
10 Lifting unit
20 Longitudinal bearer
21 Extension arm
Z1-Z6 Location of Z-positionings
Y1, Y2 Location of Y-positionings
X1 Location of X-positioning
30 Component/component group
31 Lifting cylinder
33 Tension means
34 Clamping mechanism
35 Longitudinal strut
36 Pair of friction rollers
37 Motor
39 Stop
40 Bevel roller
41 Y/Z-support
42 Roller surface
43 Depression
44 Y-form fit
50 Pair of Y-rollers
60 Running roller
61 Rail
70 Y1 strut
71 Y2 strut
72 Y1 pair of rollers
73 Y2 pair of rollers
80 Counter roller
90 Z-support set
91 Bearer
92 Adjusting plate
93 Supporting ramp
100 X-clamping jaws
110 Actuator
111 Lever joint
112 Joint bearing/joint axis
113 Roller bearing/roller axis
114 Activating lever
115 Rocker joint
120 Stop
121 Plinth
130 Drive motor
131 Transmission
132 Cardan joint
133 Belt
140 Pivot bearing
141 Extension arm
142 Spring
143 Screw
145 Stop
146 Stop
147 Profile
150 Transport plane
151 Upper positioning roller
152 Lower counterroller
160 Shaft (continuous)
161 X-position transmitter/marking-out peg
162 Receptacle
163 Belt guide
164 Lateral guide roller
170 Information region
171 Code band

We claim:

1. A conveying device for the transport of components or component groups from and to one or more workstations, the conveying device comprising a conveying track and a component carrier truck moved on the conveying track, and there being provided in the region of the workstations, on the conveying track, positioning devices which cooperate with positioning means on the component carrier truck in such a way that a desired position of the component carrier truck in the workstation is assumed in all three space directions (X, Y, Z) directly as a result of the travel-in movement of the component carrier truck into the workstation, wherein, during the entire travel-in movement of the component carrier truck into the workstation, each positioning means on the component carrier truck comes into contact with only its positioning device, determining the desired position, on the conveying track, wherein the positioning in the Z-direction is achieved by the travel of supports, preferably composed of hard metal and comprising, in particular adjusting inserts, on to positioning rollers, preferably the positioning device on the conveying track comprising, opposite the positioning roller, a tension roller or tension lever for fixing the Z-supports along the Z-direction, and wherein the positioning rollers present are arranged so as to be offset to one another transversely to the direction of forward movement along a longitudinal side of the component carrier truck in such a way that the running tracks of said positioning rollers along the direction of forward movement do not overlap one another.

2. The conveying device as claimed in claim 1, wherein cooperating positioning devices on the conveying track and positioning means on the component carrier truck comprise:

on each longitudinal side of the component carrier truck or of the conveying track at least three positioning rollers with three positioning supports for positioning in the vertical (Z) direction, along at least one diagonal or longitudinal side of the component carrier truck at least two positioning arrangements, cooperating with a form fit, for positioning transverse to the direction of movement (Y), and at least one positioning stop or positioning latch for positioning along the direction of movement (X).

3. The conveying device as claimed in claim 1, wherein there is provided on the cooperating positioning devices on the conveying track and positioning means on the component carrier truck at least partially, preferably in the Z-positionings, a lifting unit which is actuated via the component carrier truck traveling into the workstation, only shortly before said carrier truck reaches its end position.

4. The conveying device as claimed in claim 1, wherein a drive is provided which, as a friction roller drive in the conveying track, engages on a longitudinal strut on the component carrier truck and preferably comprises at least one of additional brake jaws and/or a positioning latch for positioning in the X-direction and/or a servomotor as drive.

5. The conveying device as claimed in claim 1, wherein the positioning in the Y-direction comprises at least two positioning bevel rollers which are arranged along a diagonal of the component carrier truck and which cooperate with corresponding depressions, making a form fit, in position supports and are preferably used as Z-positioning rollers and Z-supports.

6. The conveying device as claimed in claim 1, wherein the positioning in the Y-direction is set by the travel of at least one longitudinal strut into at least one jaw chuck and/or pair of rollers arranged transversely to the longitudinal direction.

7. The conveying device as claimed in claim 1, wherein at least two positioning rollers on lever joints are provided as a positioning device on the conveying track on each longitudinal side of the component carrier truck, each positioning roller, in a first vertical state of its lever joint, being arranged below a running surface of the conveying track and, in a second horizontal state of its lever joint, being arranged at least partially above the running surface, and an actuator, in particular a control cam, being provided on the component carrier truck in front of the respective positioning means, in order to transfer the respective lever joint from the vertical state into the horizontal state shortly before the end position is reached, and to allow a positioning support to travel onto the positioning roller.

8. The conveying device as claimed in claim 7, wherein each lever joint comprises restoring means, in particular a restoring spring, in order, after the positioning support has been left by the positioning roller, to return the lever joint into a vertical state again.

9. The conveying device as claimed in claim 7, wherein the lever joints are coupled to one another, in particular are connected to one another by means of a coupling linkage, and in that the actuation of the lever joints takes place by means of an actuator arranged on the foremost positioning means in the direction of movement.

10. The conveying device as claimed in claim 1, wherein rollers are provided at least partially as positioning devices on the conveying track and support sets are provided at least partially as positioning means on the component carrier truck.

11. The conveying device as claimed in claim 1, wherein the positioning devices on the conveying track and the positioning means on the component carrier truck are arranged at least partially between the running surfaces of the conveying track.

12. The conveying device as claimed in claim 1, wherein the conveying rollers are designed as a drive of the component carrier truck, the conveying rollers being suspended pivotably in the Z-direction in such a way that a pivoting height of at least one Z-positioning offset is provided, wherein the conveying rollers are pressed against the component carrier truck via force generation means and spring mounting with a defined pressure force of between 200 N and 1000 N, thereby is provided.

13. The conveying device as claimed in claim 12, wherein at least one information region selected from the group consisting of a code band, a barcode, and an RFID chip, is provided on the component carrier truck, the information carrier containing at least one of the information items selected from the group consisting of the absolute position of the component carrier truck in at least one space direction an identification of the component carrier truck and a recognition trigger of the presence of a component carrier truck, and the at least one information item is evaluated by a reader selected from the group consisting of a camera and a receiver.

14. A conveying device for the transport of components or component groups from and to one or more workstations, the conveying device comprising a conveying track and a component carrier truck moved on the conveying track, and there being provided in the region of the workstations, on the conveying track, positioning devices which cooperate with positioning means on the component carrier truck in such a way that a desired position of the component carrier truck in the workstation is assumed in all three space directions (X, Y, Z) directly as a result of the travel-in movement of the component carrier truck into the workstation, wherein, during the entire travel-in movement of the component carrier truck into the workstation, each positioning means on the component carrier truck comes into contact with only its positioning device, determining the desired position, on the conveying track, and wherein the positioning means comprising at least a z-support positioned to travel between a positioning roller and another roller in the region of the workstations, the z-support being pressed downward by the positioning roller when the component carrier truck is in the desired position in the Z space direction in the workstation.

15. The conveying device of 14, wherein the another roller is a lower counter roller.

16. The conveying device of 14, wherein the another roller is a conveying roller biased upward on a pivoting arm.

17. The conveying device of 14, wherein the conveying roller biased upward on the pivoting arm moves downward from the component carrier truck to enable the component carrier truck to move into the desired position in the Z space direction in the workstation.

18. A conveying device for the transport of components or component groups from and to one or more workstations, the conveying device comprising a conveying track and a component carrier truck moved on the conveying track, and there being provided in the region of the workstations, on the conveying track, positioning devices which cooperate with positioning means on the component carrier truck in such a way that a desired position of the component carrier truck in the workstation is assumed in all three space directions (X, Y, Z) directly as a result of the travel-in movement of the component carrier truck into the workstation, wherein, during the entire travel-in movement of the component carrier truck into the workstation, each positioning means on the component carrier truck comes into contact with only its positioning device, determining the desired position, on the conveying track, and wherein the conveying track comprises a plurality of conveying rollers and a plurality of continuous shafts, each of the plurality of continuous shafts being driven by a motor via a belt drive arrangement and arranged between conveying rollers of the plurality of conveying rollers so that only one drive coupling per pair of conveying rollers is required.

19. The conveying device of 18, wherein the plurality of conveying rollers includes a conveying roller biased upward on a pivoting arm, and the motor and belt drive arrangement position so that a distance from a motor shaft to the continuous shaft is equal to a distance between a center of rotation of the conveying roller biased upward on the pivoting arm to a bearing of the pivoting arm.

* * * * *